United States Patent [19]

Niemela

[11] Patent Number: 5,369,343
[45] Date of Patent: Nov. 29, 1994

[54] SYSTEM AND METHOD FOR PERMANENT MAGNET DC MOTOR REVERSING

[75] Inventor: Paul W. Niemela, Pickens, S.C.

[73] Assignee: Ryobi Motor Products, Easley, S.C.

[21] Appl. No.: 20,566

[22] Filed: Feb. 22, 1993

[51] Int. Cl.⁵ ............................................. H02P 1/22
[52] U.S. Cl. .................................... 318/280; 318/293
[58] Field of Search ............... 318/256, 280, 284, 285, 318/287, 288, 289, 291, 293, 294

[56] References Cited

U.S. PATENT DOCUMENTS

| | | |
|---|---|---|
| 1,175,367 | 3/1916 | Lum . |
| 1,732,711 | 10/1929 | Boddie . |
| 2,098,069 | 11/1937 | Stewart . |
| 2,426,378 | 8/1947 | Stanley . |
| 2,972,103 | 2/1961 | Cunniff . |
| 3,229,181 | 8/1963 | Evans . |
| 3,290,575 | 12/1966 | Modiano . |
| 3,305,718 | 2/1967 | Waldron . |
| 4,987,353 | 1/1991 | Imaeda . |
| 5,023,493 | 6/1991 | Wresinski . |
| 5,132,600 | 7/1992 | Kinoshita . |

Primary Examiner—Bentsu Ro
Attorney, Agent, or Firm—Brooks & Kushman

[57] ABSTRACT

System and method for selecting a rotational direction of a permanent magnet DC motor, the system including multiple relays and a control switch electrically interconnected so as to provide an open circuit to the motor when the motor is off. In one embodiment, the system includes first and second relays each including switch contacts and a coil for switching voltage to the motor. The system also includes a third relay including switch contacts and a coil for switching voltage to the motor, a control switch having multiple switch positions for selecting the rotational direction of the motor. The control switch, the motor and the relays are electrically interconnected such that a first control switch position provides a first voltage to the motor, a second control switch position provides a second voltage to the motor, the second voltage being opposite in polarity to the first voltage, and a third control switch position provides the open circuit to the motor.

19 Claims, 2 Drawing Sheets

PRIOR ART

SYSTEM AND METHOD FOR PERMANENT MAGNET DC MOTOR REVERSING

TECHNICAL FIELD

The present invention relates to permanent magnet DC motors and, more particularly, to a system and method for reversing the rotational direction of permanent magnet DC motors.

BACKGROUND ART

The use of permanent magnet DC motors has become widespread, due at least in part to its lower cost as compared to other types of motors. Electronic circuits have been devised to control the direction of current in the motor armature. By reversing the direction of current flowing through the motor armature, the rotational direction of the motor can be controlled. so as to operate the motor in two directions, i.e. clockwise rotation and counter-clockwise rotation. Examples of existing motor reversing circuits are disclosed in U.S. Pat. Nos. 3,229,181, issued to A. C. Evans; 3,305,718, issued to C. F. Waldron, 4,987,353, issued to Imaeda; 5,023,493, issued to Wrzesinski; and 5,132,600, issued to Kinoshita.

Referring now to FIG. 1, there is illustrated an existing circuit 10 for reversing the rotational direction of a motor 16. As shown, the circuit 10 includes a control switch 22 and relays 24 and 28 which are electrically interconnected. The motor brushes 12 and 14 are electrically connected to negative voltage through normally closed relay contacts shown generally by reference numerals 18 and 20, respectively. When the control switch 22 is moved to the clockwise (CW) position, the coil associated with the relay 24 is energized, actuating the relay contacts 18 and 26. As a result, positive voltage is applied to the motor brush 12 through the normally open contact 26 associated with the relay 24. With the brush 14 of the motor still connected to negative voltage through the normally closed contact 20 associated with relay 28, the motor 16 is operated in a clockwise direction.

With continuing reference to FIG. 1, if the control switch 22 is moved to the counterclockwise (CCW) position, the coil associated with the relay 28 is energized, actuating the relay contacts 20 and 30. As a result, positive voltage is applied to the motor brush 14 through the normally open contact 30. With the motor brush 12 still connected to negative voltage through the normally closed contact 18, the motor runs in a counter-clockwise direction.

A primary disadvantage associated with existing reversing circuits, including the circuit shown in FIG. 1, is the fact that when the control switch 22 is switched from either the CW or CCW position to the "OFF" position, the motor 16 is electrically shorted. For example, if the motor 16 is running in counter-clockwise direction, current is flowing through the motor from brush 14 to brush 12. When the control switch is moved to the "OFF" position, the motor armature continues to rotate, generating a large current which flows in the same direction from the motor 16 through the brush 12 and the normally closed contact 18. The normally closed contact 18 and the normally closed contact 20, being electrically connected to the same point, create a closed circuit path for this current to follow. Thus, the generated current also flows through the normally closed contact 20 and back to the motor 16 through the brush 14. This large current has been shown to significantly shorten the life and degrade performance of the motor brushes and the relay contacts over time.

DISCLOSURE OF THE INVENTION

It is, therefore, an object of the present invention to provide an improved reversing circuit for controlling the rotational direction of a permanent magnet DC motor.

It is a further object of the present invention to provide an improved circuit for reversing the rotational direction of a motor wherein the motor is not shorted when turned off, thereby prolonging motor brush and relay contact life.

In carrying out the above objects and other objects and features of the present invention, a system is provided for selecting a rotational direction of a permanent magnet DC motor. The system comprises first and second switch means for switching voltage to the motor, the first and second switch means being actuated by at least one actuator from a first operating state associated with a first rotational direction to a second operating state associated with a second rotational direction. The system also comprises third switch means for switching voltage to the motor and a control switch, the third switch means being actuated by an actuator from a first operating state associated with the first rotational direction to a second operating state associated with the second rotational, the control switch having multiple switch positions for selecting the rotational direction of the motor. The control switch, the motor and the switch means are electrically interconnected such that a first control switch position provides a first voltage associated with the first rotational direction to the motor, a second control switch position provides a second voltage to the motor, the second voltage being associated with the second rotational direction and having a polarity opposite that of the first voltage, and a third control switch position provides an open circuit to the motor.

In a preferred construction, the first and second switch means cooperate to provide the first voltage to the motor, and the first, second and third switch means cooperate to provide the second voltage to the motor. The first voltage includes a positive voltage from the first switch means and a negative voltage from the second switch means, and the second voltage includes a positive voltage from the second and third switch means and a negative voltage from the first switch means. The third switch means preferably has a normally open switch contact which cooperates with the second switch means to provide the open circuit to the motor.

The advantages accruing to the present invention are numerous. For example, the reversing circuit of the present invention prevents the motor from being shorted when off and, therefore, prevents large generated currents from passing through the motor brushes and relay contacts. As a result, motor brush life and relay contact life are significantly increased.

The above objects and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 2:
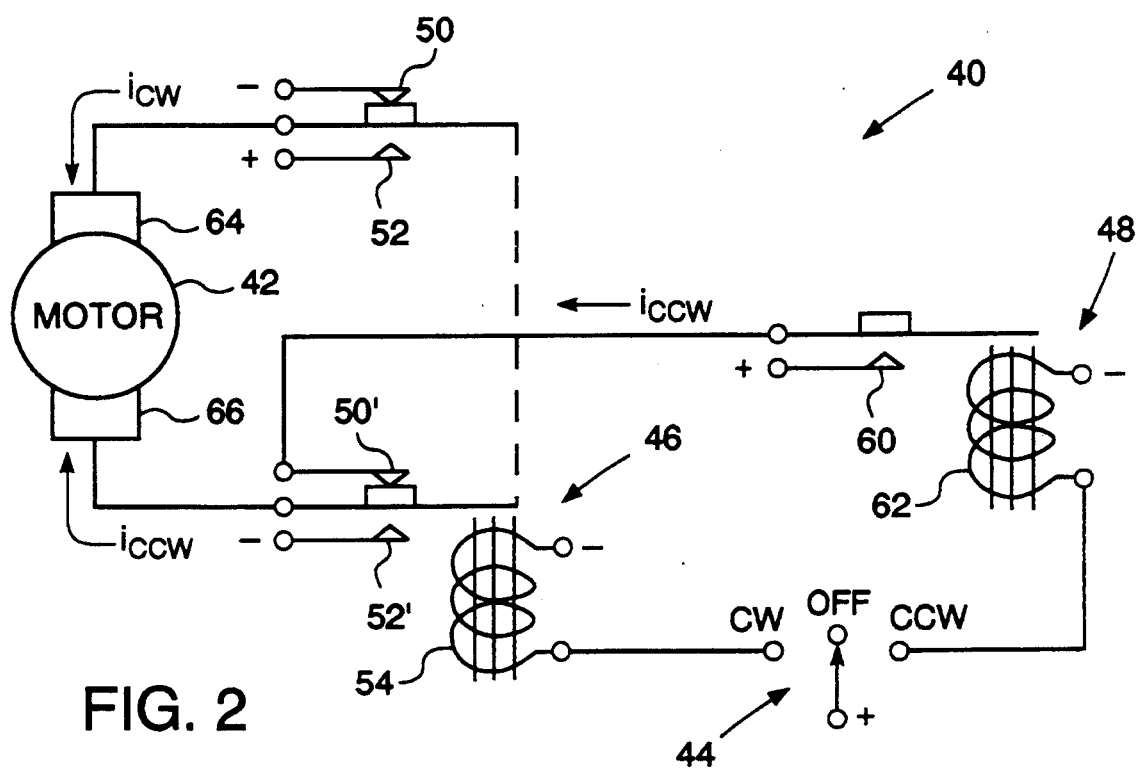
FIG. 2 is a schematic representation of a first permanent magnet DC motor reversing circuit of the present invention.

Referring now to FIG. 2, there is illustrated a first circuit embodiment of the present invention, shown generally by reference numeral 40, for reversing the rotational direction of a motor 42. As shown, the circuit 40 includes a control switch 44, a double-pole, double-throw (DPDT) relay 46 and a single-pole, single-throw (SPST) relay 48. The DPDT relay 46 has associated normally closed (NC) contacts 50 and 50' and associated normally open (NO) contacts 52 and 52', which are actuated upon energization of the coil 54. The relays thus provide switching means for switching voltage to the motor.

With continuing reference to FIG. 2, the SPST relay 48 has an associated normally open contact 60 which is actuated upon energization of the coil 62. It should be noted that the NO contact 60 is electrically connected to the NC contact 50'. Control switch 44 is a multi-position switch electrically connected to the coils 54 and 62 and is used by an operator to select a desired rotational direction for the motor 42. More specifically, the control switch 44 switches positive voltage to the coils 46 and 48, the other ends of which are electrically connected to negative voltage. As shown, coil 54 is energized upon selection of a clockwise rotation, whereas coil 62 is energized upon selection of a counterclockwise rotation.

Preferably, the NC contact 50 and the NO contact 52' are electrically connected to negative voltage, and the NO contacts 52 and 60 are electrically connected to positive voltage. Because the normally closed contact 50' is connected to the NO contact 60, the contact 50' "floats" when the control switch is in the "OFF" position. This arrangement provides significant advantages, as described in greater detail below.

As shown in FIG. 2, the motor 42 includes motor brushes 64 and 66. In this preferred embodiment, when the control switch 44 is in the "OFF" position, the brush 64 is electrically connected to the NC contact and the brush 66 is electrically connected to the NC contact 50' and, therefore, the NO contact 60. Depending on the rotational direction selected with the control switch 44, the motor brushes 64 and 66 become electrically connected to differing voltage polarities, enabling the motor 42 to operate.

With continuing reference to FIG. 2, operation of the circuit arrangement 40 will now be discussed. Initially, when the control switch 44 is in the "OFF" position as shown, the motor brush 64 is connected to negative voltage through the NC contact 50 and the motor brush 66 is "floating". As such, the motor is not operating i.e., not rotating in either direction.

When the control switch 44 is moved from the "OFF" position to the clockwise (CW) position, coil 54 is energized. As a result, the NC contact 50' opens and the NO contact 52' closes, applying a negative voltage to the motor brush 66. Since the relay 46 is a double-pole, double-throw relay, energization of the coil 54 also causes the NC contact 50 to open and the NO contact 52 to close, applying a positive voltage to motor brush 64. With these voltage polarities on the brushes, current ($i_{cw}$) flows through the motor armature in the direction indicated by the arrow, and the motor 42 runs in a clockwise direction.

With continuing reference to FIG. 2, if the control switch 44 is moved from the "OFF" position to the CCW position, coil 62 is energized. As a result, the NO contact 60 closes, applying positive voltage to the motor brush 66 through the normally closed contact 50'. Since the coil 54 is not energized, normally closed contact 50 remains closed, applying negative voltage to the motor brush 64. With these voltage polarities on the brushes, current ($i_{ccw}$) flows through the motor armature in the direction indicated by the arrow, and the motor 42 runs in a counterclockwise direction.

When the control switch is moved to the "OFF" position from the CW position, coil 54 is deenergized and the associated contacts return to the normal operating state. More specifically, NC contacts 50 and 50' close and NO contacts 52 and 52' open, removing the voltage polarities required for clockwise rotation from the motor brushes 64 and 66. However, the motor armature does not stop rotating immediately upon switching the control switch to the "OFF" position. Rather, the armature keeps rotating due to its inertia, resulting in a large generated current.

When the control switch is moved to the "OFF" position from the CCW position, coil 62 is deenergized and the NO contact 60 returns to its normal operating state, i.e. open. As such, the positive voltage polarity required for CCW rotation is removed from brush 66. The motor armature, however, does not stop rotating immediately upon switching the control switch to the "OFF" position. Rather, the armature keeps rotating, resulting in a large generated current.

Figure 1:
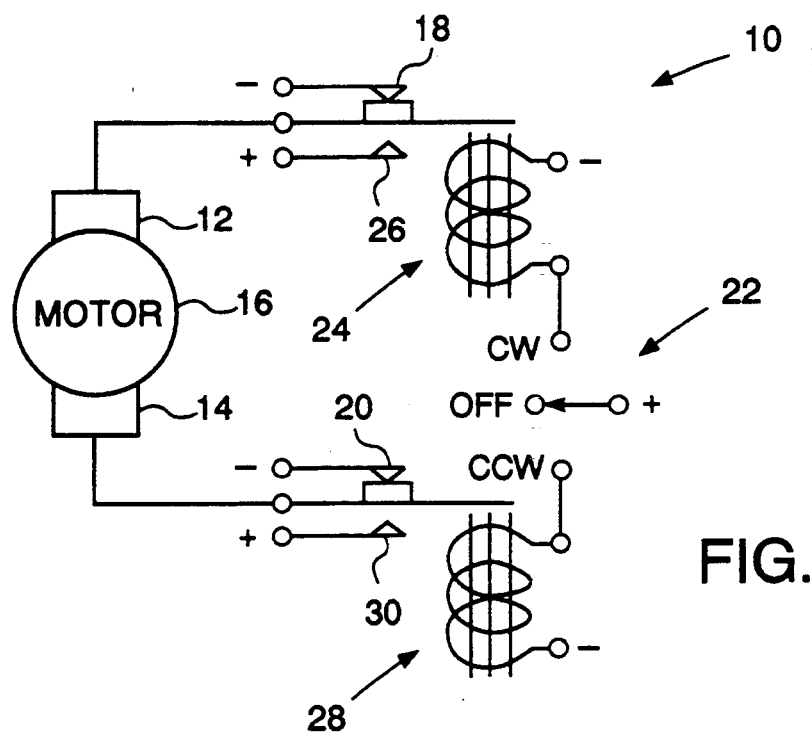
FIG. 1 is a schematic representation of an existing permanent magnet DC motor reversing circuit.

It should be appreciated that, unlike the embodiment of FIG. 1, the circuit arrangement 40 does not provide a closed circuit path through the motor brushes and relay contacts for the generated currents to follow. More specifically, the circuit path leading from brush 66 including NC contact 50' is an open circuit due to NO contact 60 of relay 48. It should also be appreciated that the circuit path leading from brush 64 and including NC contact 50 does not provide a closed circuit path. Although NC contact 50 and contact 52' are electrically connected to the same point, the contact 52' is open with the control switch 44 in the "OFF" position. As a result, there is no circuit path leading back into the motor 42 through the brush 66, as in the embodiment of FIG. 1.

Numerous advantages accrue to the circuit arrangement 40. Since there is no complete circuit path, the large generated current does not flow through the motor brushes 64 and 66. Similarly, the large generated current does not flow through the relay contacts. The net effect is a significant prolongation (e.g. twice as long) of motor brush life and relay contact life. Additionally, since the brushes are not subjected to these large generated currents, the motor will operate more efficiently longer.

Figure 3:
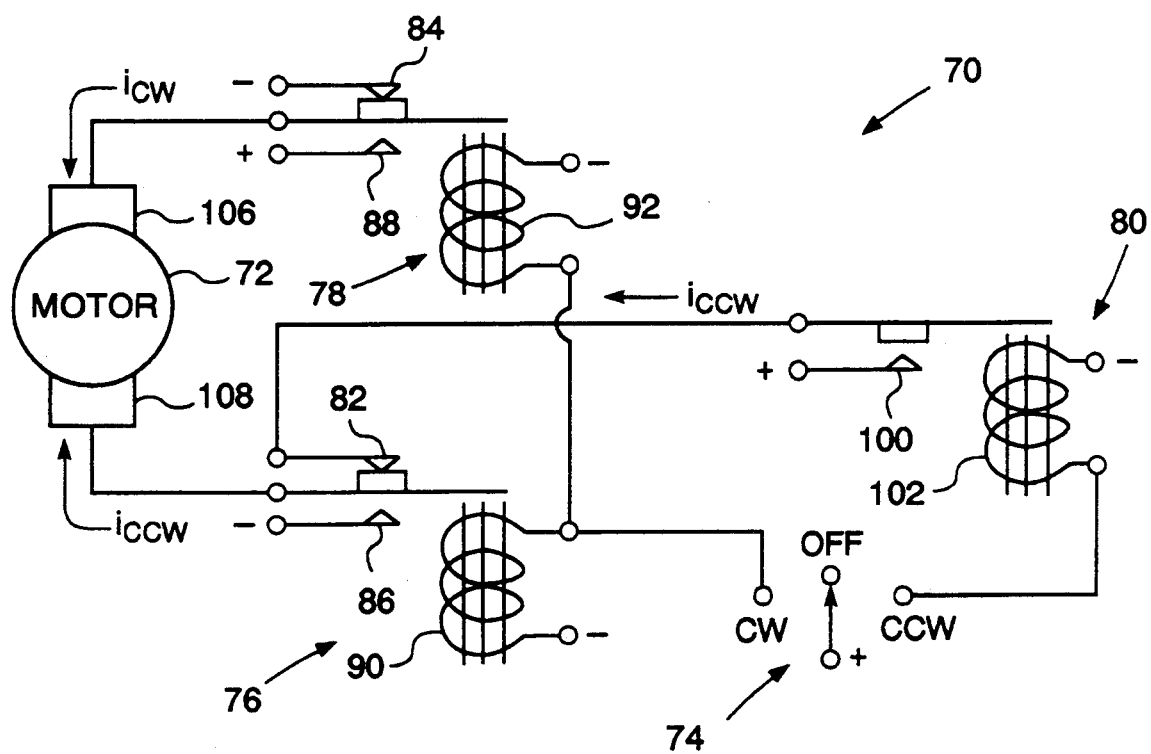
FIG. 3 is a second embodiment of a permanent magnet DC motor reversing circuit of the present invention.

Referring now to FIG. 3, there is illustrated a second circuit arrangement of the present invention, shown generally by reference numeral 70, for reversing the rotational direction of a motor 72. As shown, the circuit 70 includes a control switch 74, a pair of single-pole, double-throw (SPDT) relays which act together shown generally by reference numerals 76 and 78, and a single-pole, single-throw relay 80. The SPDT relays 76 and 78 have associated normally closed (NC) contacts 82 and 84, respectively, and associated normally open (NO) contacts 86 and 88, respectively. The contacts 82 and 86 are actuated upon energization of the relay coil 90, whereas the contacts 84 and 88 are actuated upon energization of the relay coil 92. It should be noted that coils 90 and 92 are electrically connected, such that both are energized substantially simultaneously.

With continuing reference to FIG. 3, the SPST relay 80 has an associated normally open contact 100 which is actuated upon energization of the coil 102. It should be noted that the NO contact 100 is preferably electrically connected to the NC contact 82. Control switch 74 is a multi-position switch electrically connected to the coils 90, 92 and 102, and is used by an operator to select a desired rotational direction for the motor 72. More specifically, the control switch 74 switches positive voltage to the coils, the other ends of which are electrically connected to negative voltage, as shown in FIG. 3. Coils 90 and 92 are energized upon selection of a clockwise rotation, whereas coil 102 is energized upon selection of a counterclockwise rotation.

Preferably, the NC contact 84 and the NO contact 86 are electrically connected to negative voltage, and the NO contacts 88 and 100 are electrically connected to positive voltage. Because the normally closed contact 82 is connected to the NO contact 100, the contact 82 "floats" when the control switch is in either the "OFF" position or the "CW" position. This arrangement provides significant advantages, as described in greater detail below.

As shown in FIG. 3, the motor 72 includes motor brushes 106 and 108. In this preferred embodiment, the brush 106 is electrically connected to the normally closed contact 84, and the brush 108 is electrically connected to the normally closed contact 82 and, therefore, the normally open contact 100. Depending on the rotational direction selected with the control switch 74, the motor brushes 106 and 108 become electrically connected to differing voltage polarities, enabling the motor 72 to operate.

With continuing reference to FIG. 3, operation of the circuit arrangement 70 will now be discussed. Initially, when the control switch 74 is in the "OFF" position as shown, the motor brush 106 is connected to negative voltage through the NC contact 84 and the motor brush 108 is "floating". As such, the motor is not operating i.e., not rotating in either direction.

When the control switch 74 is moved from the "OFF" position to the clockwise (CW) position, coils 90 and 92 are simultaneously energized. As a result, the NC contacts 82 and 84 open and the NO contacts 86 and 88 close, applying a positive voltage to motor brush 106 and a negative voltage to the motor brush 108. With these voltage polarities on the brushes, current ($i_{cw}$) flows through the motor armature in the direction indicated by the arrow, and the motor 72 runs in a clockwise direction.

With continuing reference to FIG. 3, if the control switch 74 is moved from the "OFF" position to the CCW position, only coil 102 is energized. As a result, the NO contact 100 closes, applying positive voltage to the motor brush 108 through the NC contact 82. Since the coils 90 and 92 are not energized, normally closed contacts 82 and 84 remain closed, thereby applying a negative voltage to the motor brush 106. With these voltage polarities on the brushes, current ($i_{ccw}$) flows through the motor armature in the direction indicated by the arrow, and the motor runs in a counterclockwise direction.

When the control switch is moved to the "OFF" position from the CW position, coils 90 and 92 are deenergized and the associated contacts return to their normal operating state. More specifically, NC contacts 82 and 84 close and NO contacts 86 and 88 opens removing the voltage polarities required for clockwise rotation from the motor brushes 106 and 108. However, the motor armature does not stop rotating immediately upon switching the control switch to the "OFF" position. Rather, the armature keeps rotating due to its inertia, resulting in a large generated current.

When the control switch is moved to the "OFF" position from the CCW position, coil 102 is deenergized and the NO contact 100 returns to its normal operating state, i.e. open. As such, the positive voltage polarity required for CCW rotation is removed from brush 108. The motor armature, however, does not stop rotating immediately upon switching the control switch to the "OFF" position. Rather, the armature keeps rotating, similarly resulting in a large generated current.

It should be appreciated that, unlike the embodiment of FIG. 1, the circuit arrangement 70 does not provide a closed circuit path through the motor brushes and relay contacts for the generated currents to follow. More specifically, when the control switch 74 is in the "OFF" position, the circuit path leading from brush 108 including NC contact 82 is an open circuit due to NO contact 100. It should also be appreciated that the circuit path leading from brush 106 and including NC contact 84 does not provide a closed circuit path. Although NC contact 84 and NO contact 86 are electrically connected, the contact 86 is open with the control switch in the "OFF" position. As a result, there is no circuit path leading back into the motor 72 through the brush 108, as in the embodiment of FIG. 1.

As previously discussed with reference to the embodiment of FIG. 2, numerous advantages accrue to the circuit arrangement 70. Since there is no complete circuit path, the large generated current does not flow through the motor brushes. Similarly, the large generated current does not flow through the relay contacts. The net effect is a significant prolongation (e.g. twice as long) of motor brush life and relay contact life. Additionally, since the brushes are not subjected to these large generated currents, the motor will operate more efficiently longer.

The circuit arrangements 40 and 70 of the present invention have numerous potential uses, but are particularly well-suited to low voltage reversible motor drive systems that have high input current requirements. For example, the circuit arrangements could be used in marine applications that require a reversing motor, such as tilt-trim systems for outboard or inboard-outboard boat drive units. Additionally, the circuit arrangements could be used in truck and automotive applications that require reversing motors, such as power window drives, power seat drives, or convertible top drives.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. A system for selecting a rotational direction of a permanent magnet DC motor, the system comprising:
    first and second switch means for switching voltage to the motor, the first and second switch means being actuated by at least one actuator from a first operating state associated with a first rotational direction to a second operating state associated with a second rotational direction;
    third switch means for switching voltage to the motor, the third switch means being actuated by an actuator from a first operating state associated with the first rotational direction to a second operating state associated with the second rotational direction; and
    a control switch having multiple switch positions for selecting the rotational direction of the motor,
    the control switch, the motor and the switch means being electrically interconnected such that a first control switch position provides a first voltage associated with the first rotational direction to the motor, a second control switch position provides a second voltage to the motor, the second voltage being associated with the second rotational direction and having a polarity opposite that of the first voltage, and a third control switch position provides an open circuit to the motor.

2. The system of claim 1 wherein the first and second switch means cooperate to provide the first voltage to the motor, and wherein the first, second and third switch means cooperate to provide the second voltage to the motor.

3. The system of claim 2 wherein the first voltage includes a positive voltage from the first switch means and a negative voltage from the second switch means, and wherein the second voltage includes a positive voltage from the second and third switch means and a negative voltage from the first switch means.

4. The system of claim 1 wherein the third switch means has a normally open switch contact which cooperates with the second switch means to provide the open circuit to the motor.

5. The system of claim 1 further comprising at least two coils associated with the first, second and third switch means, one of the at least two coils being energized when the first control switch position is selected so as to actuate the first and second switch means substantially simultaneously, the other of the at least two coils being energized when the second control switch position is selected so as to actuate the third switch means.

6. The system of claim 5 wherein the first and second switch means are formed as a double-pole, double-throw relay, and the third switch means is formed as a single-pole, single-throw relay.

7. The system of claim 1 further comprising at least three coils associated with the first, second and third switch means, at least two coils being energized when the first control switch position is selected so as to actuate the first and second switch means, at least one coil being energized when the second control switch position is selected so as to actuate the third switch means.

8. The system of claim 7 wherein the first and second switch means are each formed as a single-pole, double-throw relay, and the third switch means is formed as a single-pole, single-throw relay.

9. A system for selecting a rotational direction of a permanent magnet DC motor, the system comprising:
    a first relay for switching voltage to the motor, the first relay including a pair of switch contacts actuable by at least one coil from a first operating state associated with a first rotational direction to a second operating state associated with a second rotational direction;
    a second relay for switching voltage to the motor, the second relay including switch contacts actuable by at least one coil from a first operating state associated with the first rotational direction to a second operating state associated with the second rotational direction; and
    a control switch having multiple switch positions for selecting the rotational direction of the motor,
    the control switch, the motor and the relays being electrically interconnected such that a first control switch position provides a first voltage associated with the first rotational direction to the motor, a second control switch position provides a second voltage to the motor, the second voltage being associated with the second rotational direction and having a polarity opposite that of the first voltage, and a third control switch position provides an open circuit to the motor.

10. The system of claim 9 wherein the pair of switch contacts associated with the first relay cooperate to provide the first voltage to the motor, and wherein the first and second relays cooperate to provide the second voltage to the motor.

11. The system of claim 10 wherein the first voltage includes a positive voltage from one of the switch contacts of the first relay and a negative voltage from the other of the switch contacts of the first relay, and wherein the second voltage includes a positive voltage from one of the switch contacts of the first relay and a negative voltage from the other of the switch contacts of the first relay and from the second relay.

12. The system of claim 9 wherein the second relay has a normally open switch contact which cooperates with the first relay to provide the open circuit to the motor.

13. The system of claim 9 wherein the first relay is a double-pole, double-throw relay, and the second relay is a single-pole, single-throw relay.

14. A system for selecting a rotational direction of a permanent magnet DC motor, the system comprising:
    first and second relays for switching voltage to the motor, the first and second relays including switch contacts each actuable by a coil from a first operating state associated with a first rotational direction to a second operating state associated with a second rotational direction;
    a third relay for switching voltage to the motor, the third relay including switch contacts actuable by a coil from a first operating state associated with the first rotational direction to a second operating state associated with the second rotational direction; and
    a control switch having multiple switch positions for selecting the rotational direction of the motor,
    the control switch, the motor and the relays being electrically interconnected such that a first control switch position provides a first voltage associated with the first rotational direction to the motor, a second control switch position provides a second voltage to the motor, the second voltage being associated with the second rotational direction and having a polarity opposite that of the first voltage, and a third control switch position provides an open circuit to the motor.

15. The system of claim 14 wherein the first and second relays cooperate to provide the first voltage to the motor, and wherein the first, second and third relays cooperate to provide the second voltage to the motor.

16. The system of claim 15 wherein the first voltage includes a positive voltage from the first relay and a negative voltage from the second relay, and wherein the second voltage includes a positive voltage from the second and third relays and a negative voltage from the first relay.

17. The system of claim 14 wherein the third relay has a normally open switch contact which cooperates with the second relay to provide the open circuit to the motor.

18. The system of claim 14 wherein when the first control switch position is selected, the switch contacts of the first and second relays are actuated by the coils substantially simultaneously, and wherein when the second control switch position is selected, the switch contacts of the third relay are actuated by the coil.

19. A method for controlling the rotational direction of a motor, the method comprising:

providing first, second and third actuable switch means for switching voltage to the motor, the switch means being actuable by at least one actuator;

providing a control switch having multiple positions for selecting a desired rotational direction of the motor;

electrically interconnecting the motor, the actuable switch means and the control switch such that a first control switch position provides a first voltage associated with a first rotational direction to the motor, the first and second switch means being electrically interconnected to provide the first voltage, a second control switch position provides a second voltage to the motor, the second voltage being associated with a second rotational direction and having a polarity opposite that of the first voltage, the first, second and third switch means being electrically interconnected to provide the second voltage, and a third control switch position provides an open circuit to the motor;

selecting one of the control switch positions corresponding to a desired rotational direction of the motor so as to operate the motor; and selecting the third control switch position so as to provide an open circuit to the motor.

* * * * *